US012749387B2

(12) United States Patent
Bellerjeau

(10) Patent No.: US 12,749,387 B2
(45) Date of Patent: Sep. 29, 2026

(54) PROGRESSIVE SMART HOME TEMPERATURE MONITORING AND ALERT SYSTEM

(71) Applicant: DISH Network L.L.C., Englewood, CO (US)

(72) Inventor: Amber Bellerjeau, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 71 days.

(21) Appl. No.: 18/591,518

(22) Filed: Feb. 29, 2024

(65) Prior Publication Data

US 2025/0278995 A1 Sep. 4, 2025

(51) Int. Cl.
*G08B 21/18* (2006.01)
*G08B 21/02* (2006.01)
*G08B 27/00* (2006.01)

(52) U.S. Cl.
CPC ........... *G08B 21/182* (2013.01); *G08B 21/02* (2013.01); *G08B 27/005* (2013.01)

(58) Field of Classification Search
CPC ..... G08B 21/182; G08B 21/02; G08B 27/005
USPC .......................................................... 340/854
See application file for complete search history.

(56) References Cited

U.S. PATENT DOCUMENTS 7,047,092 B2 * 5/2006 Wimsatt ................. G05B 15/02 345/184
8,321,885 B2 * 11/2012 Pino, Jr. ............. H04N 21/6131 725/12
8,375,118 B2 * 2/2013 Hao ....................... G05B 15/02 715/736
8,516,087 B2 * 8/2013 Wilson ............... H04N 21/4131 709/224
8,954,088 B1 * 2/2015 Gravino ................ H04W 4/029 455/457
9,268,345 B2 * 2/2016 Mirza ...................... F24F 11/52
9,845,050 B1 * 12/2017 Garza ................ G08B 21/0205
10,558,323 B1 * 2/2020 Von Dehsen ........ G05B 19/042
11,544,941 B2 * 1/2023 Artuso ................ B60R 11/0247
2015/0193127 A1 * 7/2015 Chai ..................... G06F 3/0482 715/719
2016/0240060 A1 * 8/2016 Wang .................. H04L 12/6418
2016/0364114 A1 * 12/2016 Von Dehsen ....... G06F 3/04842
2018/0025604 A1 * 1/2018 Protopsaltis ......... B60N 2/0035 340/457
2018/0202870 A1 * 7/2018 Esposito ................ G01K 1/024
2018/0359358 A1 * 12/2018 Alghoniem ........... H04M 3/543
2019/0051144 A1 * 2/2019 David ................ G08B 21/0415
2019/0205655 A1 * 7/2019 Matsuoka ............ G06V 10/143
(Continued)

*Primary Examiner* — Zhen Y Wu
(74) *Attorney, Agent, or Firm* — Kilpatrick Townsend & Stockton LLP

(57) ABSTRACT

A smart home temperature monitoring and alert system is disclosed. The system offers progressive temperature warnings within a household, especially under extreme weather conditions or when the thermostat is malfunctioning. It utilizes internet-connected devices like set-top boxes, smartphones, smartwatches, and external thermometers to monitor and validate temperature data. The system is designed to provide timely alerts on various devices and integrates predictive analytics for preemptive warnings during potential heatwaves or power outages. It also includes a feature to contact emergency responders or designated contacts in critical situations, particularly for vulnerable individuals.

17 Claims, 7 Drawing Sheets

(56) References Cited

U.S. PATENT DOCUMENTS

| | | | | |
|---|---|---|---|---|
| 2021/0334563 | A1 * | 10/2021 | Artuso | B60R 11/0247 |
| 2022/0154957 | A1 * | 5/2022 | Joo | F24F 11/61 |
| 2023/0035710 | A1 * | 2/2023 | Szczepanski | H04L 67/12 |
| 2025/0033539 | A1 * | 1/2025 | Rutelin | G06F 3/153 |

* cited by examiner

PROGRESSIVE SMART HOME TEMPERATURE MONITORING AND ALERT SYSTEM

BACKGROUND OF THE INVENTION

Extreme weather conditions can lead to hazardous indoor temperatures, especially when the household thermostat is broken or not operating correctly. Vulnerable individuals, such as the elderly or those with certain medical conditions, are at increased risk during such events. Existing systems may not adequately provide timely and progressive warnings or integrate with emergency services for prompt assistance.

The urgency for an advanced home temperature monitoring system becomes particularly apparent when considering the sudden and often undetected onset of heat stroke, especially in vulnerable populations such as the elderly. Heat stroke can manifest rapidly and without warning, leaving the affected individual unaware and unable to take necessary preventive actions. This risk is exacerbated in scenarios where indoor temperatures rise gradually and unnoticed due to thermostat malfunctions or inefficiencies. The elderly and those with certain health conditions are particularly susceptible, as they may not recognize early symptoms of heat stroke, which include confusion, dizziness, and fatigue. Heat stroke can take only a few minutes before setting in, making the need for a quick response even more important.

In many instances, the ability to respond (such as adjusting the thermostat, seeking hydration, or moving to a cooler area) may be significantly impaired by the time the affected individuals become aware of their condition. Traditional thermostat systems or warning systems, with their limited capabilities, may fail to address these critical situations effectively. Additionally, third parties may not be aware of the risk to the affected individual due to a lack of warning, response, or being overwhelmed.

Additionally, in some geographic areas or locations, it may not be customary to have cooling or heating systems in a dwelling (or only have such systems located in one or more rooms). These severe weather events are exacerbated in such locations as there are no mechanisms to help regulate temperature. In other cases, other emergency events such as blackouts may take place where no electricity is available. These events further complicate any existing systems to provide timely care.

Thus, there is a need to provide systems and methods to monitor temperature, analyze a subject and their health needs, and initiate emergency responses.

BRIEF SUMMARY OF THE INVENTION

This invention introduces an integrated system that utilizes smart home technology and predictive analytics to monitor indoor and outdoor temperatures, providing real-time, progressive alerts and emergency contact capabilities in critical situations, and to provide alerts, suggest medications or other actions to take to reduce the severity of a critical situation.

Embodiments of the disclosed invention introduces methods and systems to monitors indoor and outdoor temperatures but also employs algorithms capable of identifying potential temperature related risks before they escalate to critical levels. By providing progressive, context-aware alerts and initiating automatic emergency response protocols, this system aims to protect the health and safety of individuals prone to heat-related illnesses, ensuring timely intervention in critical situations.

Embodiments of the disclosed invention include a smart home temperature monitoring and alert system which offers a multitude of advantages that extend beyond just environmental control and emergency response by providing progressive alerts and context aware alerts and reactions. These advantages enhance the user experience, improve safety, and contribute to the overall efficiency and adaptability of the system.

Embodiments of the disclosed invention include a user interface. The interface allows users to interact with the system effectively. The user interface may be configured based on the type of alert present or previously presented, age of the user, pets within the home, guests visiting the home, or other characteristics of the user (e.g., being differently abled, colorblind, blind, or interacting with just voice or tactile commands, but not a visual touchscreen). The user interface may be configured such that whether a user is acknowledging an alert or adjusting settings, the user can navigate the system with minimal effort, which is particularly beneficial for individuals who may be less familiar with smart home technologies.

Embodiments of the disclosed invention include the system's integration with multiple devices. By leveraging the ubiquitous presence of personal devices like smartphones and smartwatches, the system ensures that users receive timely alerts no matter where they are. This multi-device compatibility also allows for redundancy, which is critical in ensuring that alerts are not missed if one device fails or is inaccessible. Further, the disclosed invention can interact with smart home devices or IoT devices to take actions to lower the temperature related risk at any given moment.

Embodiments of the disclosed invention include predictive analytics capabilities to allow for a proactive approach to home safety. By analyzing historical data and current trends, the system can anticipate potential issues and advise users to take preemptive measures. This could be particularly advantageous during extreme weather events or in scenarios where users must be alerted to take an action before conditions become hazardous (e.g., preparing a cold bath, opening windows, using a fan, having cool liquid on hand).

The automated emergency contact feature may be advantageous for families with elderly or vulnerable members or with pets. In the event that a user does not respond to an alert, the system can automatically notify pre-determined emergency contacts or services, ensuring that help is dispatched quickly when needed.

Embodiments of the disclosed technology include customizable settings, allowing users to tailor alerts and responses to their specific preferences and needs. This customization can range from setting preferred alert tones to determining which devices should receive certain types of notifications, creating a personalized experience that aligns with the user's lifestyle or needs. These additional advantages deliver a user-centric solution for temperature management and emergency preparedness.

Embodiments of the disclosed technology include a method for monitoring and alerting with respect to household temperature or weather conditions including the following steps. The method may include collecting temperature data from multiple sources, including at least one indoor temperature sensor and one outdoor temperature sensor. This data may be analyzed within a monitoring unit, comparing it against predetermined temperature thresholds to identify any abnormal temperature conditions. Based on this analysis, progressive alerts may be generated, which may escalate in severity and urgency depending on the duration and severity of the detected abnormal conditions. These alerts may be transmitted to various user devices connected within a household network.

User responses to these alerts may be received through the interconnected devices, which may allow for the adjustment of the alert mechanism based on the feedback provided. If a satisfactory user response is not received or a critical temperature condition is detected, the system may automatically initiate communication with predefined emergency contacts or emergency services. Furthermore, the method or systems may employ predictive analytics within the monitoring unit or a processing unit to anticipate potential extreme temperature events by analyzing historical data and current weather forecasts, thus adjusting the alerting protocol accordingly. Additionally, information which is related to the types of devices available within the home (e.g., air conditioning, heating unit, fans, ventilation, sprinklers, refrigerators, autonomous blinds, smart windows, fireplace) can all be used when evaluating a potential risk or modify one or more characteristic of the progressive alerts.

The monitoring unit can be integrated or distributed between various devices, such as a set-top box, a dial-up telephone, or other device, expanding the system's accessibility. The system may be designed to interact with environmental control mechanisms, enabling the automatic adjustment of household heating or cooling systems in response to detected abnormal temperature conditions. Users may interact with a user interface to customize temperature thresholds, alert preferences, and emergency contact settings, enhancing the system's adaptability to individual needs. As one example, a pet door may be opened to allow a pet to escape, water can be disbursed, or windows can be opened or shades closed.

Predictive analytics and prediction models may be utilized to refine the system's responsiveness based on the accumulation of new temperature data, user interactions, and outcomes of previous alert responses. This includes monitoring additional environmental parameters such as humidity, air quality, or the presence of individuals within the household. Progressive alerts are tailored to include visual, auditory, and tactile notifications, catering to the capabilities of the receiving device and user preferences.

Integration with weather services or weather related data sources may allow the system to incorporate real-time weather alerts into its monitoring and alerting process. Other features enable users to share control or monitoring capabilities with trusted individuals, facilitating community-based support. To ensure the privacy and security of user data and emergency communication, the system may employ encryption for data transmission. Self-diagnostics or health checks may be conducted on sensors and networked devices to ensure the system's reliability. Devices supported includes smartphones, smartwatches, smart TVs, and other internet-connected devices.

Additionally, the system can detect the presence of pets and modifying its analysis accordingly. This includes utilizing machine learning algorithms that factor in the physical characteristics of the pet for more accurate environmental assessment.

A system may comprise a network of temperature sensors, a monitoring unit for data analysis, a network interface for device interconnection, an alert mechanism for generating and managing alerts, an emergency communication interface or mechanism, and a user interface for system customization and interaction. The monitoring unit may include predictive analytics capabilities to foresee potential extreme temperature events, enhancing the system's preventive measures. An emergency communication interface or module may be implemented when power is not available to allow for other communication (e.g., radio wave, SMS, Bluetooth, Bluetooth to enable command of a cell phone, or SOS messages) which may be picked up even when power or internet communication is unavailable. This system facilitates detailed temperature monitoring and alert management but also ensures user-centric control and customization, making it a solution for household temperature regulation and emergency preparedness.

Embodiments of the disclosed technology include a method for monitoring and alerting household temperature conditions. The method may comprise collecting temperature data from a plurality of sources, including at least one indoor temperature sensor, and one outdoor temperature sensor; analyzing the collected temperature data in a monitoring unit, where the analysis involves comparing the data against predetermined temperature thresholds to determine the presence of abnormal temperature conditions; generating progressive alerts based on the analysis, wherein the alerts escalate in severity and urgency in response to the duration and severity of the detected abnormal temperature conditions; transmitting the generated alerts to a plurality of interconnected user devices; receiving user responses to the transmitted alerts via the interconnected user devices and adjusting the alert mechanism based on the received responses; and automatically initiating communication with predefined emergency contacts or emergency services, based on the severity of the detected temperature condition, in an absence of a satisfactory user response or detection of a critical temperature condition. Predictive analytics may be used within the monitoring unit to anticipate potential extreme temperature events and adjusting the alert protocol. The monitoring unit may be a set top box. The environmental control mechanisms to enable automatic adjustment of household heating or cooling systems in response to detected abnormal temperature conditions. A user interface may be configured to customize temperature thresholds, alert preferences, and emergency contact settings. Predictive analytics or prediction based on user interactions and outcomes of previous alert responses. The method may include monitoring or analyzing additional environmental parameters, including humidity, air quality, smoke, or presence of individuals within the household. The progressive alerts may include visual, auditory, and tactile notifications tailored to the capabilities of the receiving device and the preferences of the user. The method may include further comprising receiving from local weather services real-time weather alerts and incorporating the data. A social feature may be included to enable sharing control or monitoring capabilities with trusted individuals. The method may include enabling a smart home device to abate the critical temperature condition. The method may include comprising conducting self-diagnostics on sensors and networked devices. The said devices may include but are not limited to smartphones, smartwatches, smart TVs, and other internet-connected devices. The method may include further comprising receiving a signal from a tag indicating the presence of a pet and modifying the analysis based on the presence of a pet. The analysis is based on a machine learning algorithm which includes information about a physical characteristic of the pet.

Embodiments may include a system. The system may include a monitoring and alerting household temperature conditions, comprising: a plurality of temperature sensors distributed within and outside a household to collect temperature data, including at least one indoor temperature sensor and one outdoor temperature sensor; an interconnected user device with a user interface allowing users to customize at least one of temperature thresholds, alert preferences, emergency contact settings, and further configured to interact with and respond to alerts; and an analysis device, the analysis device configured to: analyze the collected temperature data by comparing the data against predetermined temperature thresholds to determine the presence of abnormal temperature conditions; interconnect with a plurality of user devices within the household for transmitting generated progressive alerts, generate and transmit the progressive alerts to the interconnected user devices and to receive user responses to the alerts, wherein the alert mechanism adjusts based on the received user responses; and automatically initiate communication with predefined emergency contacts based upon a severity of the detected temperature condition. The monitoring unit may include a predictive analytics unit to anticipate potential extreme temperature events based on historical data and current weather forecasts. A user interface accessible via the user devices, allowing users to customize temperature thresholds, alert preferences, emergency contact settings and to interact with and respond to alerts.

Embodiments may include an analysis device comprising a processing unit, the processing unit configured to: analyze weather information by comparing the data against predetermined temperature thresholds to determine the presence of abnormal temperature conditions; generate progressive alerts based on the abnormal weather conditions; configure the progressive alerts for one or more user devices based on the type of user device; modify the progressive alerts based on the received user responses; a communication interface, the communication interface configured to: receive weather information from a plurality of temperature sensors, including at least one indoor temperature sensor and one outdoor temperature sensor; interconnect with one or more user devices within the household for transmitting generated progressive alerts; receive user responses to the progressive alerts; receive from one or more user devices temperature thresholds, alert preferences, emergency contact settings, and user interactions and responses to alerts; and an emergency communication interface configured to automatically initiate communication with predefined emergency contacts in the presence of a severe temperature condition.

BRIEF DESCRIPTION OF THE DRAWINGS

A further understanding of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The following Detailed Description is merely exemplary in nature and is not intended to limit the scope of the present disclosure or the application and uses of the teachings of the present disclosure.

Overview

The disclosed invention provides a comprehensive smart home temperature monitoring and alert system. Embodiments enable for monitoring of one or more individuals within a dwelling, such a home, a school, apartment, nursing home, mobile home, camper, hotel, home, or other dwelling.

The disclosed invention may use one or more internet (or other data) connected devices such as set-top boxes, smartphones, smartwatches, and fitness trackers, in conjunction with an indoor temperature source and an outdoor or external temperature source. These sources may be connected through any communication media. Real-time monitoring of both indoor and outdoor temperatures, and comparison or analysis of such temperature (or other weather information) against established safety thresholds may allow for one or more alerts to be generated. The alerts may be progressive in severity, intensity, number of devices used, and reach (e.g., who is contacted). The alert mechanism is designed to issue progressive warnings through these connected devices, with the level of urgency escalating in relation to the severity and duration of detected temperature anomalies.

In terms of emergency response, the system is capable of automatically notifying emergency services or designated contacts in situations where no user response is detected or when hazardous conditions persist. Additionally, the system allows for user interaction, enabling individuals to acknowledge alerts, confirm their safety, or request assistance. It also includes features for system deactivation or adjustment of notification settings once the detected issue is resolved. This system offers diverse embodiments and alternatives in its implementation, ensuring flexibility and adaptability to various home environments and user needs.

Predictive analysis techniques may be employed to anticipate extreme weather conditions or the nature or severity of a threat to a user. During blackouts or other events where internet based communication are not available, other mechanisms for alerts may be provided such as radio waves, short range communications, SMS, MMS, 5G, or other emergency or backhaul systems.

The system may be customized for one or more use scenarios. For example, in the case of a school, a school administrator may be made aware of a hazardous condition in one or more classrooms. In the case of an apartment building, an apartment manager may be made aware. Further, the nature of the building may be used in evaluating risk conditions (e.g., higher floors may be more prone to heat buildup due to hot air rising upwards). Alerts (and information which may be contained in alert or alert messages) may be contextually aware (e.g., based on the building or dwelling).

Example Systems and Methods

Figure 1:
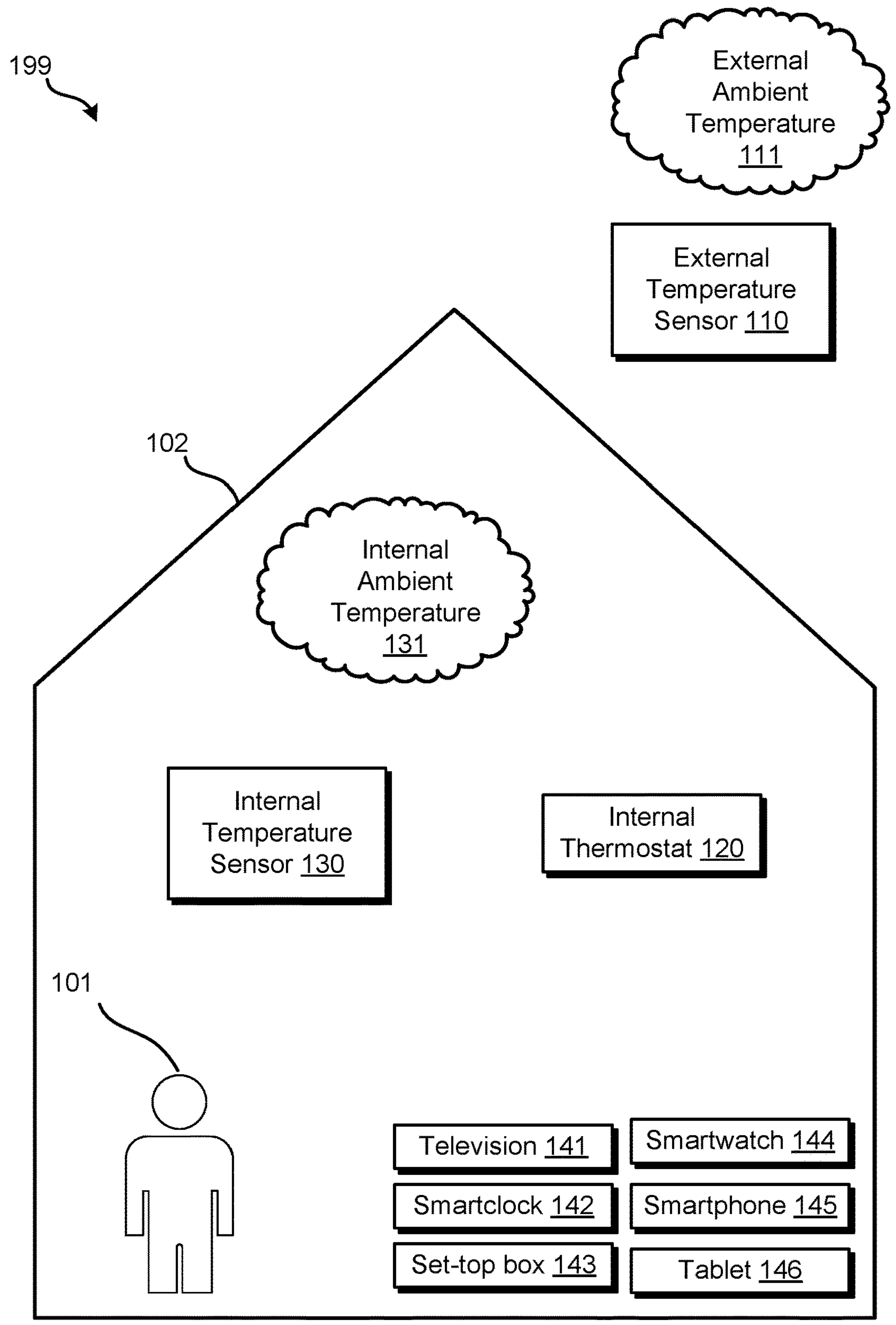
FIG. 1 illustrates an example overview in which a system may detect a weather related incident according to embodiments of the disclosed invention.

FIG. 1 depicts an example environment 100 with an integrated smart home temperature monitoring and alert system 199 for dwelling 102 (e.g., a house). This system is composed of various components, each contributing to the overall functionality of monitoring and managing the household's temperature. One or more of the devices described with respect to FIG. 1 may form a monitoring unit, which can take one or more of the actions, such as generating alerts or sending notifications, as further described herein.

In environment 100, the user 101 resides in dwelling 102 (e.g., a house), equipped with a network of interconnected devices and sensors that work in concert to monitor and manage temperature-related risks. Environment 100 may contain a system including temperature sensors, such as an external temperature sensor 110 positioned to detect the external ambient temperature 111, and an internal temperature sensor 130 located within the house to monitor the internal ambient temperature 131. These sensors may provide real-time data about the environmental conditions both inside and outside the house. User 101 may reside in dwelling 102, which serves as the primary setting for the system. Dwelling 102 may be equipped with multiple devices and sensors, forming a network designed to maintain a comfortable and safe indoor environment by monitoring temperature changes and issuing alerts as needed.

Information complementary to the external temperature sensor 110 and internal temperature sensor 130 may be a range of user devices that serve as input sources and/or alert mechanisms. Examples of this may include user device 141 (e.g., a television), user device 142 (e.g., a smart clock), user device 143 (e.g., a set-top box), user device 144 (e.g., a smartwatch), user device 145 (e.g., a smartphone), and user device 146 (e.g., a tablet). Each or a subset of these devices may be interconnected, ensuring communication and data sharing across the system. As one or more of user devices 141-146 may be interconnected, a cohesive monitoring and alert system that can respond promptly to any temperature-related anomalies may be provided within dwelling 102.

As further explained, a feature of system 199 is its ability to generate progressive alerts. These alerts are not static; they evolve based on various factors such as the duration of the temperature anomaly, its severity, and the rate of change in heat levels. For instance, a mild increase in temperature might trigger a basic alert on the user's smartphone or smartwatch. However, if the temperature continues to rise or reaches a critical threshold, more urgent alerts could be displayed on larger or more prominent devices like the television or a set-top box. Additionally, the mechanism and method of how and when alerts and delivered, or other communication sent to an emergency response unit may be adjusted. These examples are further explained below.

Positioned to assess the outdoor environment, external temperature sensor 110 may detect the external ambient temperature 111. This sensor provides critical data about outdoor conditions, allowing the system to adjust its internal settings in response to external temperature changes.

The external temperature sensor 110 can be comprised of various sensing elements, each suited to different monitoring needs. Thermistors offer rapid temperature response, while thermocouples are chosen for their wide measuring range and robustness. Resistance Temperature Detectors (RTDs) may provide high precision, making them ideal for accurate readings. Semiconductor-based sensors, often part of digital systems, may be used due to their ability to output directly to networks. Infrared sensors may be used for non-contact measurement of surface temperatures. Bimetallic devices which use two metals with differing expansion rates to mechanically indicate temperature variations may also be used. Such example devices may be encased in weatherproof housings to increase reliability and deliver critical data to the temperature management system or to an internal thermostat. Any of these sensors may be used. External temperature sensor 110 may also be a source which is provided digitally through a remote sensor (e.g., a satellite or long rang sensor). In some examples, external sensor 110 may include communication capabilities to broadcast an alert to any and all local emergency vehicles.

The internal thermostat 120 regulates the indoor temperature of dwelling 102. Internal thermostat plays a role in maintaining the desired indoor climate and works in tandem with the system to adjust settings based on the collected temperature data. Internal thermostat 120 may be a smart device, such as a smart thermostat, which may be internet connected. Internal thermostat may be set to a desired range at which to maintain the ambient temperature. The internal thermostat may also provide messages, alerts, or indications that it is malfunctioning to one or more devices or through its interface. Internal thermostat 120 may also contain a temperature sensor to measure the ambient temperature. Internal thermostat 120 may be used to facilitate or as a response mechanism to an alert when it is fixed or operational again. However, in some situations, such as a blackout or other event, internal thermostat 120 may not be operational or capable of repair, but may be powered through a battery or other power source.

Located within the house, internal temperature sensor 130 monitors the internal ambient temperature 131. Internal temperature sensor 130's readings may be used for detecting any indoor temperature fluctuations that might require an intervention. For example, when the internal temperature is higher or lower than a threshold, or higher or lower than the temperature set by the internal thermostat 120, the system may be configured to begin an alert process. In some examples, there may be multiple internal temperature sensors, which may be distributed at various locations within the home to provide additional information about the house. For example, sensors may be located at each floor of the house, one or more rooms within the house, or within a basement or attic of the house. The position of an internal temperature sensor may also be used when evaluating the overall internal ambient temperature. In other examples, the ambient temperature closest to where a user is (e.g., through motion or proximity sensing) may be used to have the most up to date or pertinent information. This may be used when additional or complementary temperature control mechanisms are present in a region of the house (e.g., a cooler basement, a window AC, or a bathroom where hot or cold water may be used to regulate the core temperature of user 101 dwelling in the home).

Additionally, system 199 includes a network of user devices, each serving as a point for alert dissemination and interaction. For example, user device 141, a TV, provides a visual platform for displaying alerts. User device 142, a smart clock, integrates time-based, audio, or other alerts into its functionality. User device 143, a set-top box, may act as a central hub for processing and transmitting alerts. User device 143 may also be capable of using coaxial or other communications as well, which can be useful when there is no power or electricity in an area. User device 144, a smartwatch, may offers a personal and portable alert interface. User device 145, a smartphone, allows for mobile receipt and acknowledgment of alerts. User device 146, a tablet, provides an additional screen for alert display and interaction. These devices may be used to generate alerts, provide indications, send messages, or take other steps. Other devices and mechanisms may be used. In some examples, user device 141 and user device 143 may be used in conjunction with one another. For example, a remote or other device may be used to provide a response to an alert or notification provided on user device 141.

System 199 may be configured to generate progressive alerts as further explained below. These alerts vary in intensity, content, or mode of delivery based on factors such as the duration and severity of a temperature or weather variation. The mechanism ensures timely and appropriate warnings are issued, allowing user 101 to take necessary actions to maintain safety and comfort within dwelling 102. Thus, a temperature monitoring and alert system may be created which provides a functional approach to managing and responding to indoor and outdoor temperature conditions.

Figure 2:
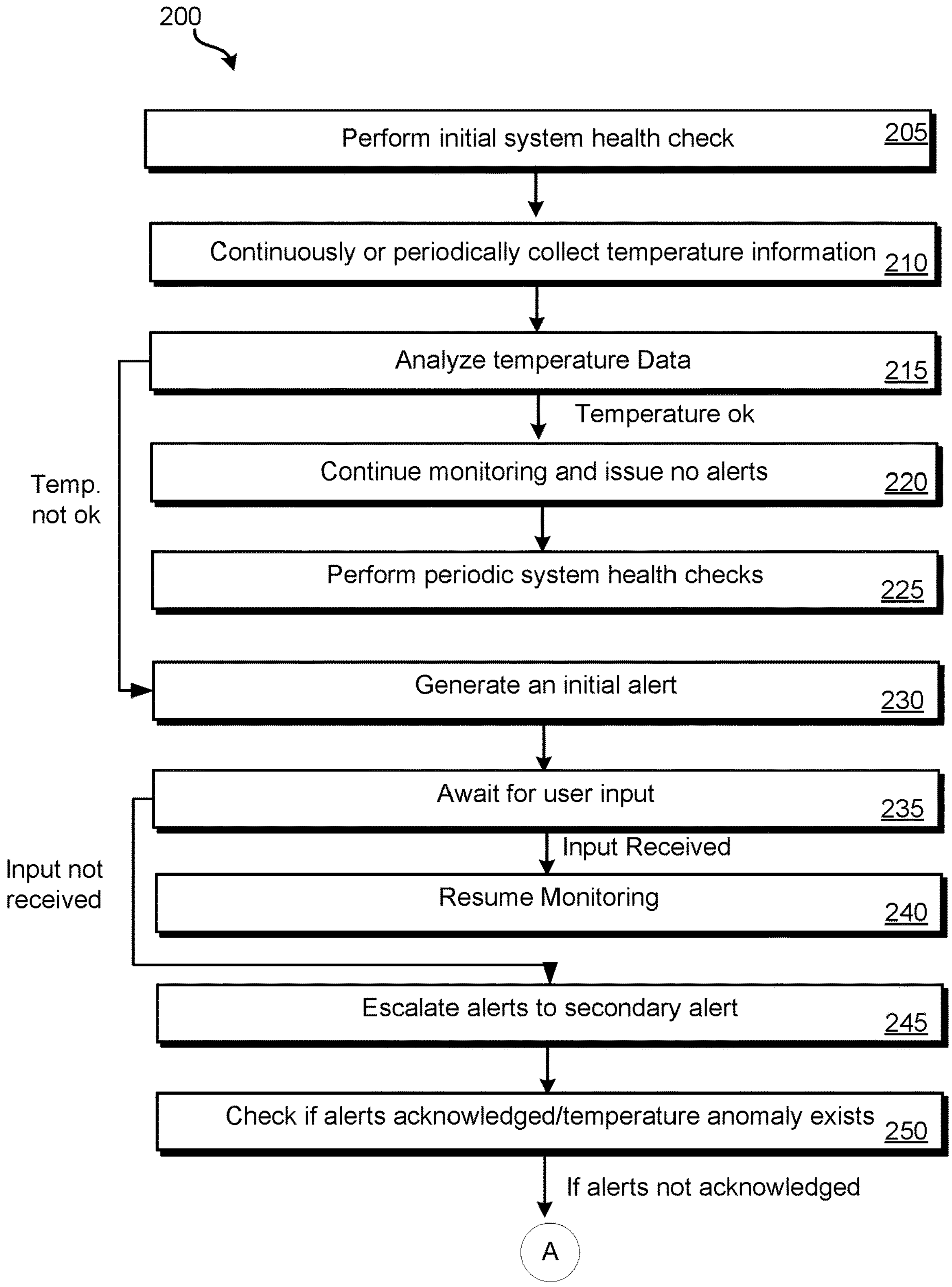
FIG. 2 is a flow diagram of an exemplary method depicting the process of data collection, analysis, and alert generation according to embodiments of the disclosed invention.
Figure 2:
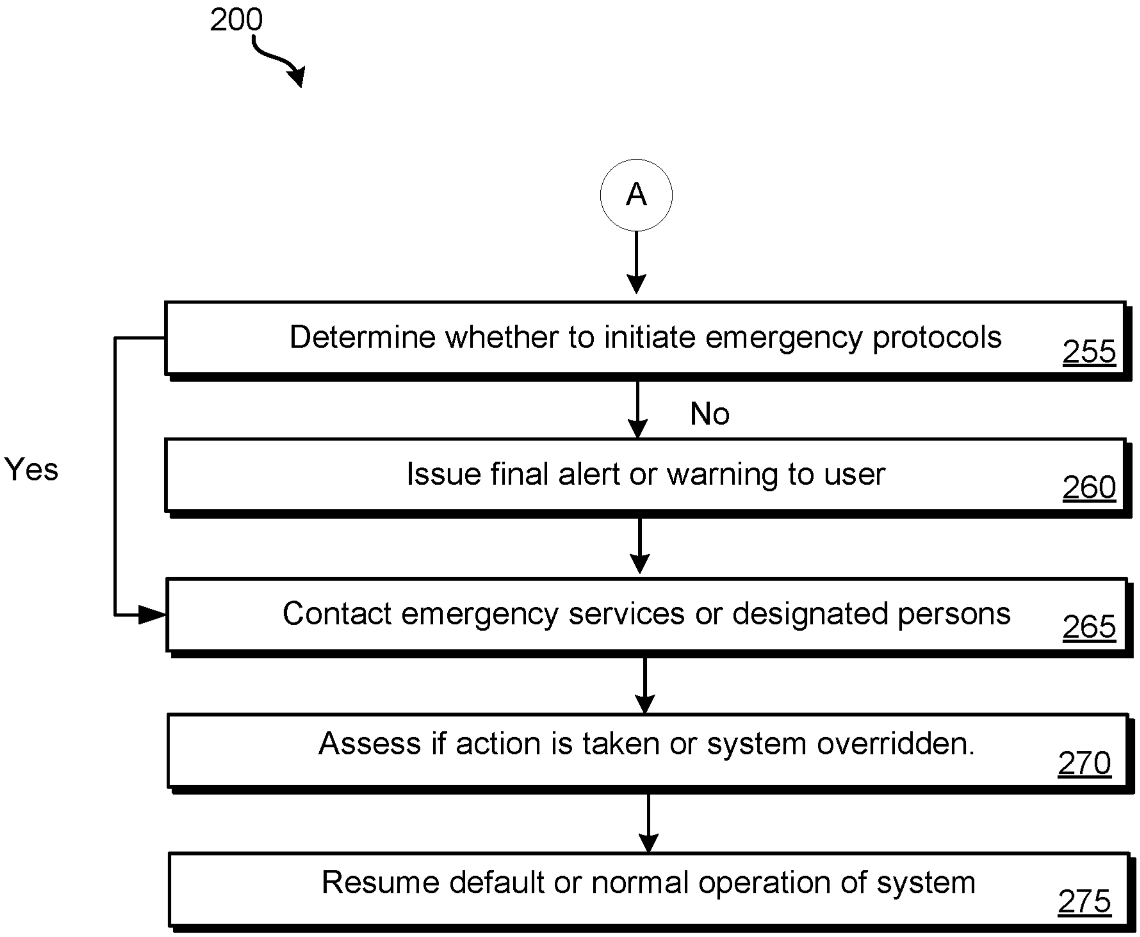

FIG. 2 is a flow diagram of an exemplary method 200 depicting the process of data collection, analysis, and alert generation. Within method 200, multiple levels or types of alerts may be generated and provided to a user, such as an initial alert, a secondary or intermediate alert, and a final alert. These alerts may increase in severity, information provided, actions required to be taken by a user, or the time period in which an action must be taken. In some examples, the alert may be generated based on the characteristics of the user who is within the home, where a dwelling is located, the nature of equipment in the home, range of temperature outside, or geographical location of the home.

At process block 205, an initial health check may be performed. This crucial step involves powering up the system and conducting a full diagnostic to ensure all components, including sensors and network connections, are operational. At this step, a thermostat may also be checked for proper operation. However, the thermostat may not know whether or not it is properly functioning due to a malfunction, and thus cannot be relied upon for a "ground truth" about the internal temperature within a house. Other checks may be performed on any portion of a system or devices.

At process block 210, temperature data from both the external and internal sensors may be collected continuously or regularly. The external sensor may measure outside ambient temperature, while internal sensors may monitor conditions within the home. Other temperature and sensor data may also be included in the information collected (e.g., data from other temperature sensors, health data from smartwatches, or data from smart or internet connected thermometers used by a user). In some embodiments, a subset of the most relevant data at a particular time may be collected or used. For example, during winter months, the current internal temperature may take priority. During hot summer months, the temperature of user 10, such as when measured through a smartwatch (user device 144) or other device, may take priority over the average ambient temperature in the house.

At process block 215, temperature data may be analyzed. At this block, the system compares the readings to predetermined safety thresholds to assess if the conditions are normal or if there is a potential for adverse temperature events. In some embodiments, the system may prioritize which data which is more accurate or truthful prior to making an evaluation. For example, data from a particular room in the house where user 101 is believed to be located at may be more accurate than other data. In some examples, the analysis may include checking for extreme temperatures inside a dwelling and confirming that temperature may be possible based on an external temperature. The analysis may also include the use of other temperature sources such as a smartwatch to look for indications that a temperature related event is taking place (e.g., elevated core temperature, cardiac irregularity, increased dielectric current from sweating).

If the temperature is within the expected or acceptable range, at block 220, normal monitoring without issuing any alerts may occur. The expected or acceptable range may be based on user 101, and may include his or her age, physical condition, underlying health issues, or other criteria. At process block 225, periodic system checks may be performed to validate the functionality of all components.

However, if the analysis at block 215 indicates abnormal temperature conditions, at block 230, an initial alert may be generated and/or sent to one or more devices. This alert may serve as a prompt for the user to take notice of the temperature discrepancy. At this step, one or more alerts can be generated based on the severity of the temperature discrepancy and the sensitivity of the user. For example, the alert may be a "soft" alert such as a reminder that there is extreme weather or that a cooling or heating unit may not be functioning properly. This "soft alert" may be targeted for only some user devices and may be configured to be non-aural. For instance, this alert may be done on a TV screen, smart watch, or other smart clock within the dwelling. In some embodiments, such as based on user configuration or preferences, a text message or other alert may be sent to a known contact (e.g., a family member, a friend, or other caregiver) that there is a potential temperature problem within the dwelling. The alert may be delivered to the user's device, which may include a combination of visual, auditory, or haptic notifications, ensuring that the user is informed of the potential issue.

At process block 235, an acknowledgment from the user can be obtained or awaited. Various interaction options are offered through an interface. These options allow the user to acknowledge the alert, access environmental controls, delve into detailed information about the situation, or initiate emergency protocols if needed. the user's response to the alert is received. This could be a simple acknowledgment, a command to adjust environmental settings, directly interacting with a thermostat, or a request for further assistance.

If the user acknowledges the alert, they have the option to adjust the thermostat or validate the temperature change. The acknowledgement may be made within a pre-determined period of time. Following this, at process block 240, resumes normal monitoring may be resumed.

In the absence of user acknowledgment at process block 235, at process block 245, the alert may be escalated to more prominent notifications on devices such as TVs or with audible alarms. These may include higher tier alerts or notifications.

At process block 250, it may be assessed if the escalated alerts have been acknowledged and if the temperature anomaly persists. If so, at block 255, it may be determined whether to initiate the emergency protocol.

If the emergency protocol is activated at process block 255, at process block 265, emergency services or designated emergency contacts may be contacted. Alternatively, if the protocol is not yet triggered, at process block 260, a final warning is issued to the user. In some examples, process block 260 may be achieved immediately depending on the severity of the situation or when other conditions are met.

At process block 270, it may assessed whether the situation has been resolved. If it has been resolved, at process block 275, all alerts are deactivated, and normal monitoring status may be resumed.

In some embodiments, additional actions or preventive steps may be taken at any time. For example, a system may control or take other actions, such as activating sprinklers to cool down a user, activate water cooling, open windows, provide hydration to a user, provide specific actions to take by a user (e.g., use ice to cool down, a heat pack to warm up, move to a warmer or cooler location in the house), suggest methods to reduce core temperature, (e.g., taking a bath, using hot water, using a damp towel), or provide a specific location where the user may be within the dwelling.

Figure 3:
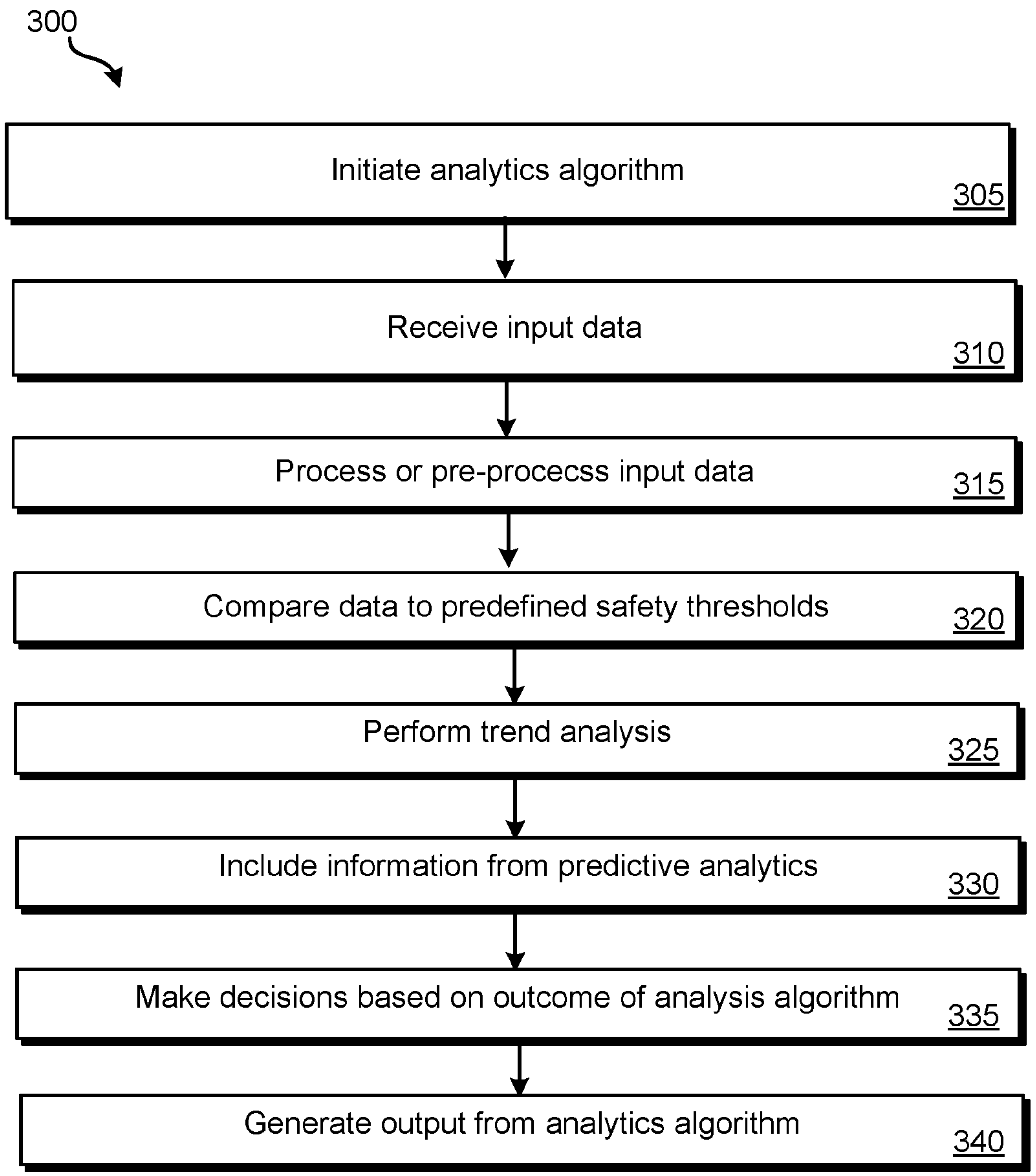
FIG. 3 is a flow diagram of an exemplary method 300 leading to contacting an emergency contact according to embodiments of the disclosed invention.

FIG. 3 is a flow diagram of an exemplary method 300 leading to contacting an emergency contact. Method 300 may use any of the steps described above with method 200.

At process block 305, the analytics algorithm may be initiated as temperature data is received or the system is otherwise initiated (e.g., based on a day with temperatures above or below a certain temperature, humidity, or other weather condition). This marks the starting point for processing and interpreting environmental data gathered by the system. Any of the sources of temperature data described herein may be utilized.

An analytics algorithm may include machine learning or artificial intelligence algorithms, which can allow for a wide range of pets, animals, climate conditions, health conditions, and other criteria (underlying health conditions, medications, high or low blood pressure, etc.) to be considered when making determinations. Training of these algorithms may include generating parameters which can be used for future predictions.

At process block 310, input data may be received, which includes external temperature readings from the outdoor sensor and internal readings from sensors within the home. Additional inputs may encompass user preferences and historical temperature patterns, providing context to the current readings.

At process block 315, input data may be pre-processed or modified. This involves normalizing the data to a consistent format and filtering out any anomalies or noise to ensure accuracy in the subsequent analysis. This may also include prioritizing certain sources of data based on accuracy or reliability (e.g., information from a public source such as a national weather service). The data may be normalized to prevent false positives from being generated at this step.

At process block 320, the processed data may be compared against predefined safety thresholds. A system determines whether current conditions fall within a safe and comfortable range or if they deviate and necessitate an alert. Predefined safety thresholds may include a maximum or minimum temperature, or a more complex algorithm which includes variable temperatures based on the user's health, age, underlying health conditions in conjunction with environmental factors such as humidity, ventilation, airspeed, or similar information. Other information, such as the age of a heating or cooling system, reliability indicators from the system or thermostat, or expected failure of a system based on extreme temperatures.

At process block 325, trend analysis on the temperature data may be performed. It examines whether there are any significant patterns, such as a rapid increase in temperature that could indicate an emerging risk. For example, if it is expected temperature may increase to an extent which is too sudden, an extreme temperature for prolonged periods, or extremely extreme, a risk metric or risk probability may be increased when evaluating a risk in the analytics algorithm.

At process block 330, predictive analytics may be used in a decision making process. At this block historical data, user settings, and external information like weather forecasts to anticipate potential future temperature conditions and their implications. Integrating short-term weather forecasts with long-term historical data can refine predictions. While historical data provides a basis for understanding general trends, incorporating real-time weather forecasts adds precision to short-term predictions. Predictive models can also include external information like solar radiation, humidity, wind patterns, and even socio-economic data, which might influence temperature conditions. For instance, urban heat island effects can be considered in predicting temperatures for city planning purposes. The solar incidence on a particular house may also be considered. Additionally, the predictive analytics may include prior maintenance records of cooling or heating units.

In some embodiments, predictive analytics techniques may also be applied to pets in the dwelling. In this example, the predictive analytics or other thresholds may be adjusted based on the presence or absence of a pet within the dwelling. In some examples, such as with a cat or a dog, a smart collar or other device may be used to detect where the pet is within a dwelling. Other information such as the breed, hydration requirements, or other information about the pet may be used to determine when or how the pet may overheat. In some examples, the emergency alerts may be sent to a veterinary service or other service based on the specific living entity which is at risk of a temperature anomaly. Thus, the methods may be used to selectively detect who is at risk, the type of alerts to generate, preventive steps to take, or the type of notifications and where to send the notifications.

At process block 335, decisions may be made based on the outcomes of its analysis. If an immediate risk is detected, a system may trigger an alert sequence. For anticipated risks, a system may schedule alerts or suggest preemptive actions to the user. In some examples, warnings may be sent to emergency response providers in advance of potential locations where it is likely that a temperature related event may occur, the nature of that dwelling (e.g., apartment, house), and information related to the person. In some examples, an emergency contact may be contacted directly if the situation is severe or a high enough risk.

At process block 340, the output from the analytics algorithm may be generated. Depending on the analysis, this may involve issuing alerts, adjusting the thermostat, or providing the user with information on maintaining optimal conditions.

Figure 4:
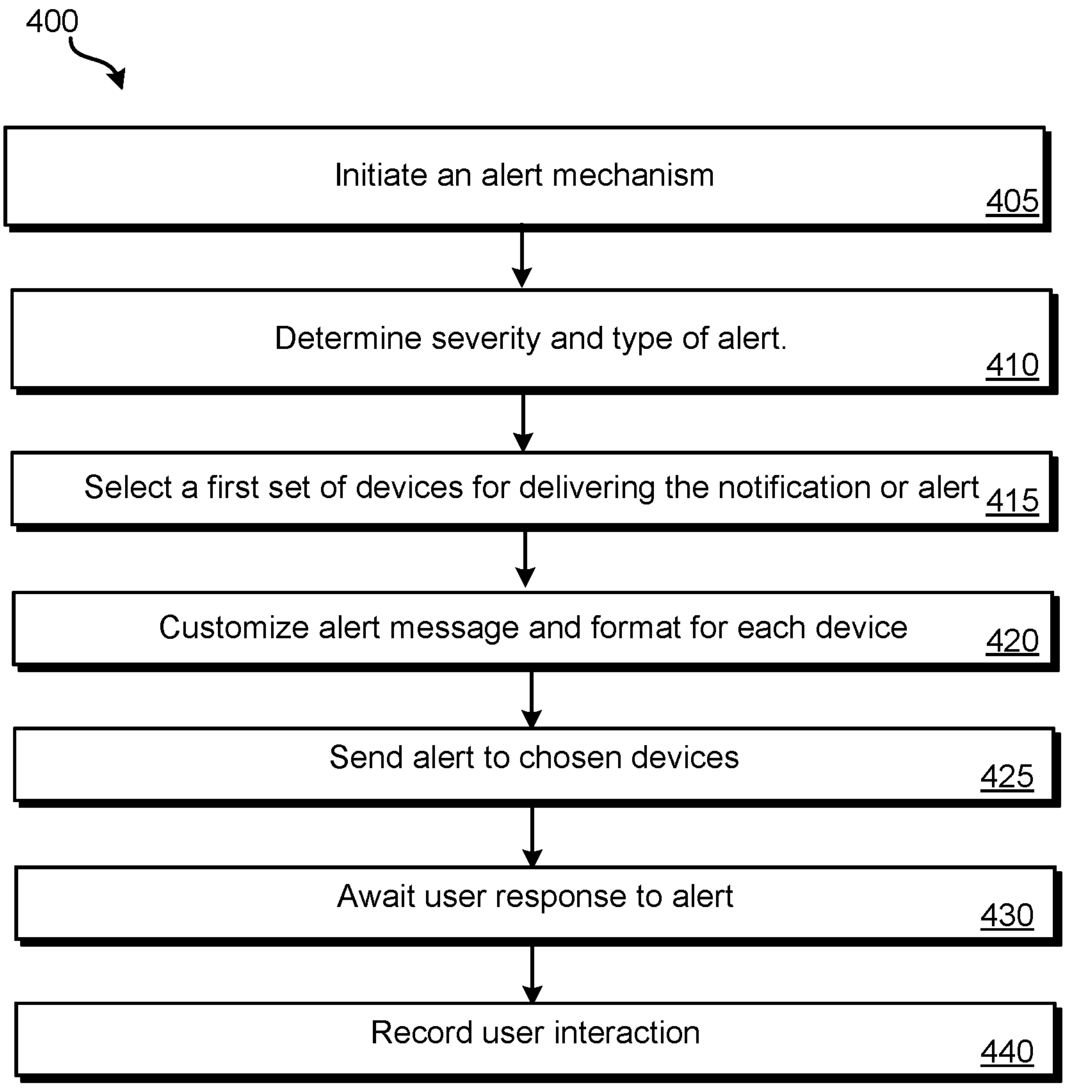
FIG. 4 is a flow diagram of an exemplary method related to generating alerts for a user according to embodiments of the disclosed invention.

FIG. 4 is a flow diagram of an exemplary method 400 related to generating alerts for a user.

At process block 405, the alert mechanism may be activated by an analytics algorithm or other algorithm when a notification is warranted, initiating the system's response to temperature anomalies.

At process block 410, the appropriate alert level may be determined based on the severity and context of the temperature data may be determined. It categorizes the alert into varying levels of urgency.

At process block 415, a first set of devices for delivering the notification may be selected. These may include personal devices like smartphones and home devices like smart TVs, based on the alert level and user preferences. The first set of devices may be the ones which are most likely to be responded to by the user.

At process block 420, an alert message may be customized or tailored for each selected device from the first set of devices. This customization ensures that the message is clear and appropriate for the device format and user accessibility. At this block, information about the device, such as placement, type of device, screen size, capabilities (e.g., ability to use speakers, LEDs, etc.) may be used. In some examples, the customization may include overriding existing use of the device. For example, with respect to a television, the alert message may take priority over any currently playing content. In some examples, a hierarchy may be used to consecutively send alerts to devices prior to starting a new sequence of alerts. The hierarchy may change based on proximity to a certain device within a dwelling.

At process block 425, the alert is sent out to the chosen devices. The method of notification may vary, including push notifications, screen messages, or alarms, to effectively capture the user's attention.

At process block 430, a system may await a user response to the alert. This may be an acknowledgment, a command to modify environmental settings, or a request for more information.

At process block 435, once the user responds, a system may evaluates the action to take. This may involve adjusting the home environment, silencing the alert, or maintaining current settings if the situation has been resolved.

At process block 440, the user's interaction with the alert may be recorded. This data may be valuable for assessing the effectiveness of the alert system and for making any necessary adjustments.

Figure 5:
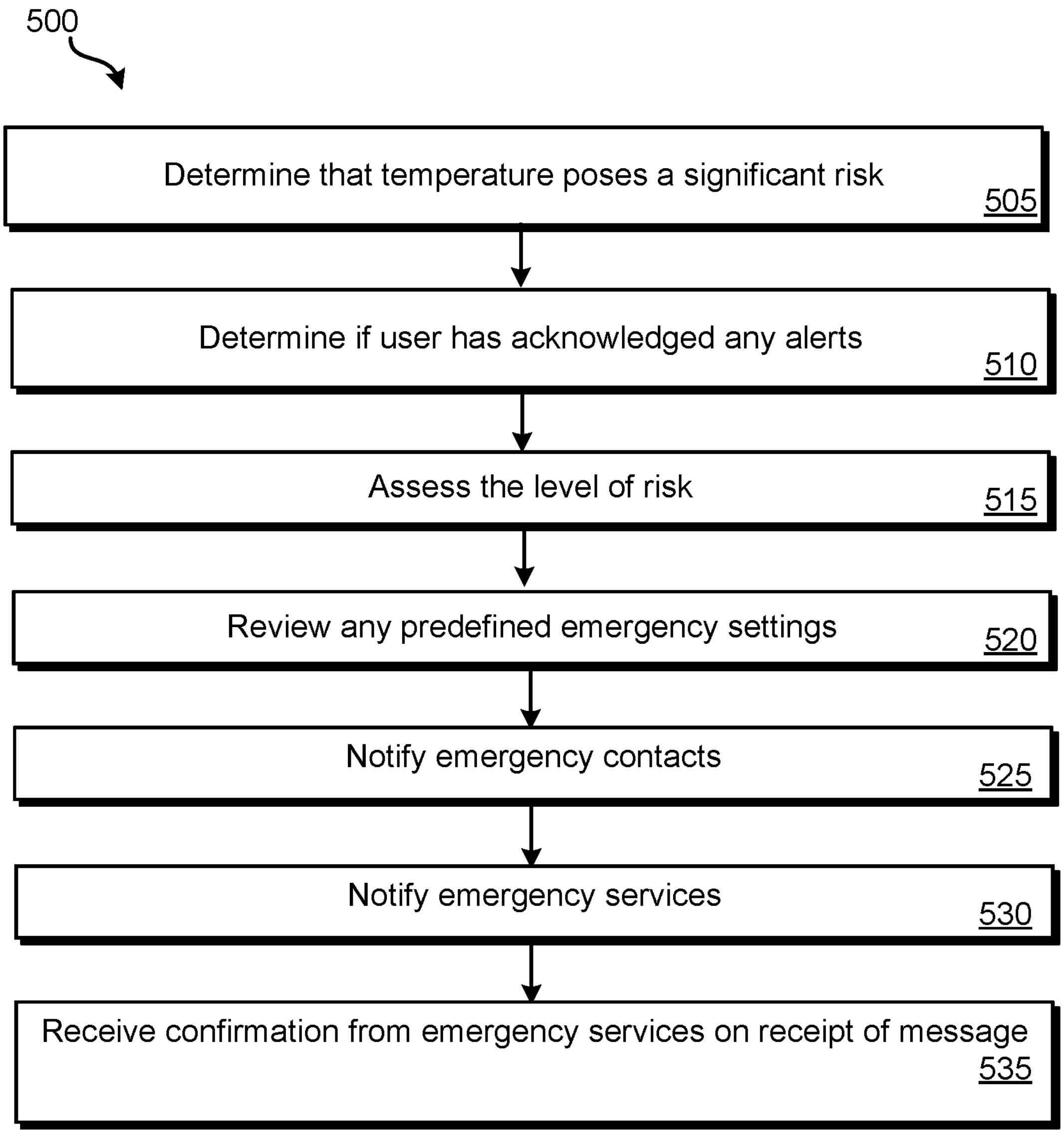
FIG. 5 is a flow diagram of an exemplary method related to initiating an emergency protocol, such as contacting emergency services according to embodiments of the disclosed invention.

FIG. 5 is a flow diagram of an exemplary method 500 related to initiating an emergency protocol, such as contacting emergency services.

At process block 505, the emergency protocol process may begin when a temperature alert indicates a significant risk, potentially requiring intervention beyond the standard alert mechanisms. This may occur during sudden changes in temperature for example.

At process block 510, the system may check whether the initial or escalated alerts have been acknowledged by the user, which is crucial for determining the next steps in the emergency protocol. In some examples, the alerts may delay or modify when and how the emergency protocol proceeds.

At process block 515, the system may assess the level of risk based on the temperature data and the absence of user acknowledgment, establishing the urgency and potential need for external intervention. For example, the level of risk may be determined by the nature of the individual in the dwelling, the types of equipment, or expected temperature rise, distance to an emergency response team, or historical emergency response times.

At process block 520, the system may review the user's predefined emergency settings. This includes verifying contact lists, preferred actions, and thresholds for automatic engagement with emergency services. This may also include which hospital to go to or a doctor to contact, or information related to how emergency services may enter the dwelling.

At process block 525, the system may activate the emergency contact protocol, which involves notifying emergency contacts that have been designated by the user ahead of time. This may be done if there is no user response as this may be considered a critical non-response scenario and proceeds with the emergency protocol. In some examples, additional steps may be taken such as unlocking a smartlock, providing an access code to the dwelling, notifying an front desk at an apartment, or initiating a video or audio call with emergency services through a tablet, smartTV, mobile device, or other smart home device.

At process block 530, based on the assessed risk level and user settings, the system may directly contact emergency services, providing them with the necessary information to respond appropriately to the situation.

At process block 535, a feedback loop is initiated, wherein the system may await confirmation that the emergency message has been received and that help is on the way. If a confirmation message is not received, additional or alternative steps can be taken, such as informing the user to call "911" or have another emergency contact receive a text message that help is on the way or is not on the way.

Figure 6:
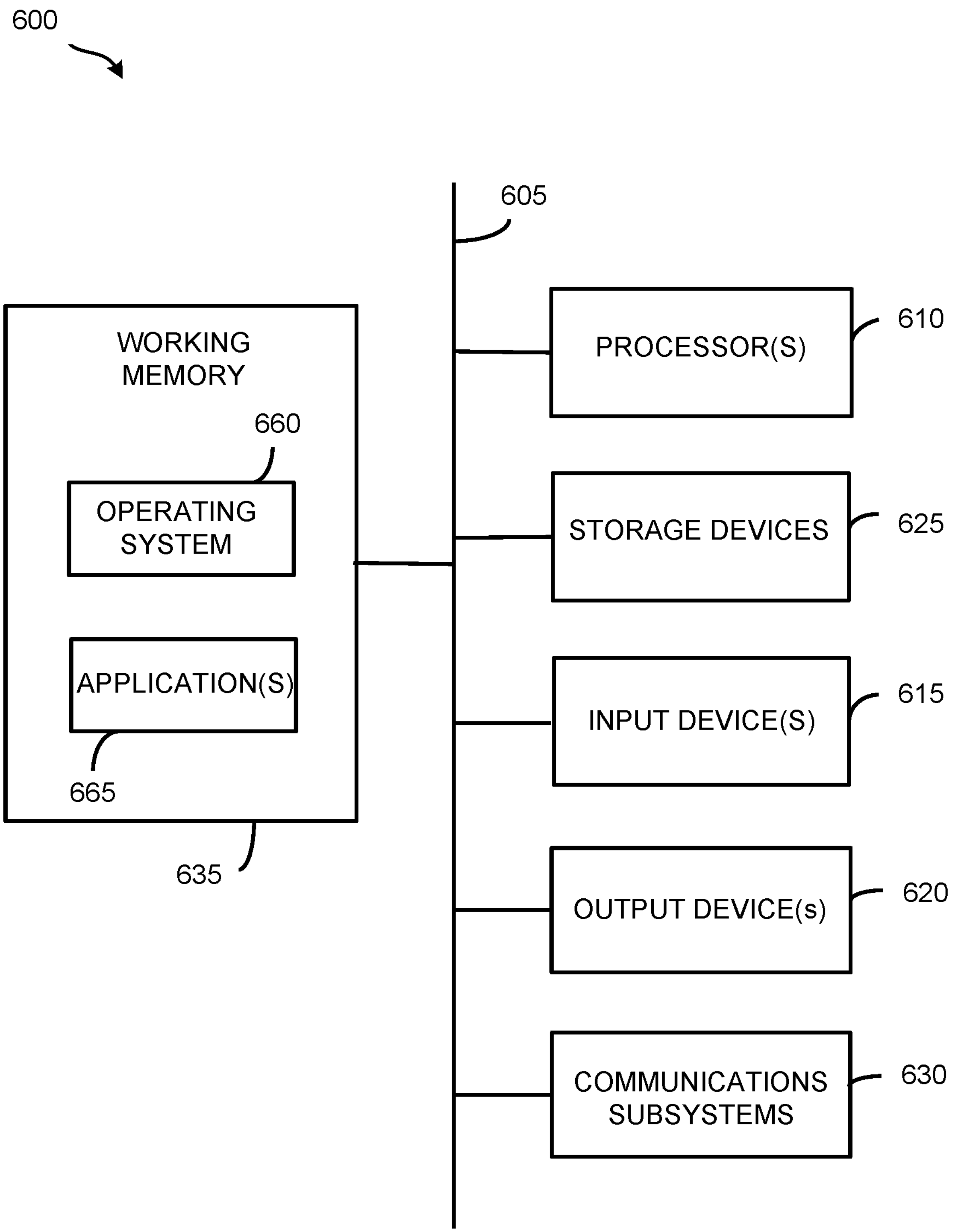
FIG. 6 is an exemplary computer system according to embodiments of the disclosed invention.

FIG. 6 is a schematic diagram illustrating an example of computer system 600. The computer system 600 is a simplified computer system that can be used to implement various embodiments described and illustrated herein. A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods and workflows provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown including hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 660, which can include without limitation a modem, a network card (wireless or wired), an infrared communication device, a wireless communication device, and/or a chipset such as a Bluetooth™ device, a 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g., the first electronic device, may be incorporated into the computer system 600, e.g., an electronic device as an input device 615. In some embodiments, the computer system 600 will further include a working memory 635, which can include a RAM or ROM device, as described above.

The computer system 600 also can include software elements, shown as being currently located within the working memory 635, including an operating system 660, device drivers, executable libraries, and/or other code, such as one or more application programs 665, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the operations of such methods are performed by the computer system 600 in response to processor 610 executing one or more sequences of one or more instructions, which might be incorporated into the operating system 660 and/or other code, such as an application program 665, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method for monitoring and alerting household temperature conditions, comprising:

collecting temperature data from a plurality of sources, including at least one indoor temperature sensor and one outdoor temperature sensor;

receiving, from local weather services, real-time weather alerts;

analyzing the collected temperature data in a monitoring unit, where the analysis involves comparing the data against one or more predetermined temperature thresholds to determine a presence of abnormal temperature conditions;

generating progressive alerts based on the analysis, wherein the alerts escalate in severity and urgency in response to a duration and severity of the detected abnormal temperature conditions;

transmitting the generated alerts to a plurality of interconnected user devices;

receiving user responses to the transmitted alerts via the interconnected user devices and adjusting an alert mechanism based on the received responses;

automatically initiating communication with predefined emergency contacts or emergency services, based on the severity of the detected abnormal temperature conditions, in an absence of a satisfactory user response or determination of a critical temperature condition, the critical temperature condition determined by the abnormal temperature conditions reaching a threshold; and receiving a signal from a tag indicating a presence of a pet and modifying the analysis based on the presence of a pet, wherein the analysis is based on a machine learning algorithm which includes information about a physical characteristic of the pet.

2. The method of claim 1, further comprising employing predictive analytics within the monitoring unit to anticipate potential extreme temperature events and adjusting an alerting protocol accordingly.

3. The method of claim 1, wherein the monitoring unit is a set top box.

4. The method of claim 1, further comprising adjusting environmental control mechanisms to enable automatic adjustment of household heating or cooling systems in response to detected abnormal temperature conditions.

5. The method of claim 1, further comprising configuring a user interface for customizing temperature thresholds, alert preferences, and emergency contact settings.

6. The method of claim 1, further comprising utilizing predictive analytics or prediction models based on the accumulation of new temperature data, user interactions, and outcomes of previous alert responses.

7. The method of claim 1, further comprising utilizing predictive analytics or prediction models based on user interactions and outcomes of previous alert responses.

8. The method of claim 1, further including monitoring or analyzing additional environmental parameters, including humidity, air quality, smoke, or presence of individuals within a household.

9. The method of claim 1, wherein the progressive alerts include visual, auditory, and tactile notifications tailored to the capabilities of at least one of the plurality of interconnected user devices and preferences of the user.

10. The method of claim 1, further including a social feature to enable sharing control or monitoring capabilities with trusted individuals.

11. The method of claim 1, further comprising enabling a smart home device to abate the critical temperature condition.

12. The method of claim 1, further comprising conducting self-diagnostics on sensors and networked devices.

13. The method of claim 1, said devices include at least one of smartphones, smartwatches, or smart TVs.

14. A system for monitoring and alerting household temperature conditions, comprising:

a plurality of temperature sensors distributed within and outside a household to collect temperature data, including at least one indoor temperature sensor and one outdoor temperature sensor, wherein at least one of the plurality of temperature sensors receive, from local weather services, real-time weather alerts;

an interconnected user device with a user interface allowing users to customize at least one of temperature thresholds, alert preferences, emergency contact settings, and further configured to interact with and respond to alerts; and an analysis device, the analysis device configured to:

analyze the collected temperature data by comparing the data against predetermined temperature thresholds to determine the presence of abnormal temperature conditions;

interconnect with a plurality of user devices within the household;

generate and transmit the progressive alerts to the interconnected user devices and to receive user responses to the progressive alerts, wherein an alert mechanism adjusts based on the received user responses;

automatically initiate communication with predefined emergency contacts based upon a severity of the detected abnormal temperature conditions; and receiving a signal from a tag indicating a presence of a pet and modifying the analysis based on the presence of a pet, wherein the analysis is based on a machine learning algorithm which includes information about a physical characteristic of the pet.

15. The system of claim 14, wherein a monitoring unit includes predictive analytics capabilities to anticipate potential extreme temperature events based on historical data and current weather forecasts.

16. The system of claim 15, further comprising a second user interface accessible via the user devices, allowing users to customize temperature thresholds, alert preferences, emergency contact settings and to interact with and respond to alerts.

17. An analysis device comprising:

a processing unit, the processing unit configured to:

analyze weather information by comparing data against predetermined temperature thresholds to determine a presence of abnormal temperature conditions, at least some of the weather data received from local weather services and including real-time weather alerts;

generate progressive alerts based on abnormal weather conditions, determined via the weather data;

configure the progressive alerts for one or more user devices based on the type of user device;

modify the progressive alerts based on received user responses;

a communication interface, the communication interface configured to:

receive weather information from a plurality of temperature sensors, including at least one indoor temperature sensor and one outdoor temperature sensor;

interconnect with one or more user devices within a household for transmitting generated progressive alerts;

receive user responses to the progressive alerts;

receive from one or more user devices temperature thresholds, alert preferences, emergency contact settings, and user interactions and responses to alerts;

an emergency communication interface configured to automatically initiate communication with predefined emergency contacts in a presence of a severe temperature condition determined by the abnormal temperature conditions reaching a threshold; and receive a signal from a tag indicating a presence of a pet and modifying the analysis based on the presence of a pet, wherein the analysis is based on a machine learning algorithm which includes information about a physical characteristic of the pet.

* * * * *